US008146001B1

(12) United States Patent
Reese

(10) Patent No.: US 8,146,001 B1
(45) Date of Patent: *Mar. 27, 2012

(54) ENHANCED ELECTRONIC MAIL DELIVERY SYSTEM

(76) Inventor: Morris Reese, Thousand Oaks, CA (US)

( * ) Notice: Subject to any disclaimer, the term of this patent is extended or adjusted under 35 U.S.C. 154(b) by 247 days.

This patent is subject to a terminal disclaimer.

(21) Appl. No.: 12/655,648

(22) Filed: Jan. 5, 2010

Related U.S. Application Data

(63) Continuation of application No. 09/564,666, filed on May 3, 2000, now Pat. No. 7,663,652.

(51) Int. Cl.
*G06F 13/00* (2006.01)
*G06F 15/00* (2006.01)

(52) U.S. Cl. ........................... 715/752; 715/744

(58) Field of Classification Search ............. 715/744, 715/751, 762–765, 804–808, 733, 740
See application file for complete search history.

(56) References Cited

U.S. PATENT DOCUMENTS

| | | | |
|---|---|---|---|
| 5,487,100 A | | 1/1996 | Kane |
| 5,809,242 A | | 9/1998 | Shaw et al. |
| 5,838,790 A | | 11/1998 | McAuliffe et al. |
| 5,870,548 A | | 2/1999 | Nielsen |
| 5,905,777 A | | 5/1999 | Foladare et al. |
| 5,944,786 A | | 8/1999 | Quinn |
| 5,956,486 A | | 9/1999 | Hickman et al. |
| 5,963,208 A | * | 10/1999 | Dolan et al. ............... 715/760 |
| 5,995,597 A | | 11/1999 | Woltz et al. |
| 6,014,502 A | | 1/2000 | Moraes |
| 6,014,689 A | * | 1/2000 | Budge et al. ............... 709/206 |
| 6,026,368 A | | 2/2000 | Brown et al. |
| 6,199,106 B1 | | 3/2001 | Shaw et al. |
| 6,453,327 B1 | * | 9/2002 | Nielsen ...................... 715/205 |
| 6,516,341 B2 | | 2/2003 | Shaw et al. |
| 6,633,850 B1 | | 10/2003 | Gabbard et al. |
| 7,103,643 B1 | | 9/2006 | Jacobs et al. |

OTHER PUBLICATIONS

"All About Internet Mail", By Lee David Jaffe, Internet Workshop Series 7, ISBN: 1-882208-20-X.
"E-Mail—A Practical Guide", By Simon Collin, ISBN: 0750 621125.
"Universal Access to E-Mail", By Robert H. Anderson, Tora K. Bikson, Sally Ann Law, Bridger M. Mitchell, ISBN: 0833023314.
"Writing Effective E-Mail", By Nancy Flynn, Tom Flynn, ISBN: 1-56052-515-0.
"A Guide to the TCP/IP Protocol Suite", By FLoyd Wilder, 1998 2nd edition, ISBN: 0-89006-976-X.
"Internet E-Mail; Protocols, Standards . . . ", By Lawrence Hughes, ISBN: 0-89006-939-5.

* cited by examiner

Primary Examiner — Kevin Nguyen

(57) ABSTRACT

The present invention relates to an electronic mail (e-mail) delivery system and more particularly to a method and apparatus for selecting a specific e-mail message from a visual list of stored e-mail messages, selecting an advertisement from a plurality of advertisements stored in an associate database, and then downloading the selected e-mail message to a recipient's e-mail receiving device and inserting the selected advertisement into the e-mail message, preferably in the e-mail message header or between the header and body (text) or after the text, as it is downloaded to the e-mail receiving device which receives and displays the downloaded e-mail message with the inserted advertisement in response to receiving a selection signal from the e-mail receiving device indicating that the recipient wishes to read the selected e-mail message.

27 Claims, 2 Drawing Sheets

ENHANCED ELECTRONIC MAIL DELIVERY SYSTEM

This is a continuation under 37 CFR 1.53 (b) (1) of prior application Ser. No. 09/564,666, filed on May 3, 2000 now U.S. Pat. No. 7,663,652 of MORRIS REESE, entitled Enhanced Electronic Mail Delivery System.

FIELD OF THE INVENTION

The invention relates generally to electronic mail delivery systems and more particularly to a method and apparatus for transferring to a recipient's electronic mail receiving device an electronic mail message with an advertisement introduced within the electronic mail message.

BACKGROUND OF THE INVENTION

Most e-mail systems allow inclusion of attachments which are binary files such as formatted documents, graphics and programs. The purpose of this function is to send items in their original format over the network. Thus you can attach a word processing file, complete with formatting features—underlining, boldface, fonts—or a graphic image that cannot be displayed over ordinary e-mail. You attach a file by including its name in the appropriate field in the message header. Files can be attached only when they are located where the e-mail program can find them. With host-based programs like PINE, files to be attached have to be located on the host system. Files on your local workstation have to be transferred to the host before they can be attached to a PINE message. Since each mail system handles attachments differently, it is critical to check with recipients beforehand. Attachments are not displayed within the message, but a flag in the mail header tells the recipient that a file is attached. At the receiving end of a message with an attachment, you are notified that there is something special going on, sometimes with some information about what to do. You detach the file from the message in order to view or use the item with the appropriate software. When the e-mail software runs on your workstation, files received as attachments end up on your hard disk automatically. With a host-based e-mail system, getting an incoming attachment to your local workstation requires transferring it from the host.

With respect to reviewing e-mail message summaries, the first view you get of incoming mail is usually a list of brief headers, including shortened versions of the date and time the messages were sent, the name of the sender, and the subject heading the sender gave it. The actual content and format of your message will vary according to your local system, but the principle is essentially the same. Your inbox contains all the new mail you have received but have not yet read. It also can contain old mail, read but not deleted, from previous sessions and, for a time, may even include messages you have deleted but not yet purged.

With respect to downloading and uploading files, it sometimes may be necessary to move files between computers in order to have items where they can be used effectively. For example, with host-based systems, messages and attachments arrive at the server. The incoming messages may be a document you wish to edit with your workstation's word processing program. Attachments to e-mail messages are coded documents that can be read only by programs on your workstation or may be programs themselves that must be run on your own system. In each case, you would have to transfer, or download, the file from the host to your own workstation (computer). Likewise, you may create files on your workstation that you wish to include as part of an e-mail message. In those cases, you will need to transfer, or upload, those files to the host system before you can use them in e-mail. In an efficient messaging engine, when a message with an attachment is sent, the attachment is stored on the post office server and the mail delivered to the recipient. Only when the recipient makes a request to open the attachment is it retrieved from the server.

The ease of sending e-mail messages on the Internet has created a significant amount of junk electronic mail that is indiscriminately downloaded into the recipient's personal computer. Value time is wasted by recipients who must winnow through unsolicited junk mail messages to find useful e-mail relevant to their personal interests.

For the foregoing reasons, it is therefore an object of the present invention to download to an electronic mail (hereinafter sometimes referred to as "e-mail") receiving device of a recipient for reading, printing, text-to-speech and/or storing an e-mail message with an inserted advertisement which is relevant to the recipient personal interests.

It is another object of the present invention to allow the e-mail recipient to "opt-in" (receive e-mail messages with inserted advertisements) or "opt-out" (receive e-mail messages without inserted advertisements).

SUMMARY OF THE INVENTION

Accordingly, a technical advance is achieved by method and apparatus for downloading (transferring) to a recipient's e-mail receiving device an e-mail message with an advertisement introduced within the e-mail message.

In the present invention, e-mail messages are received to a server servicing a recipient, where they are stored in the recipient's private mail box. After a send list signal is received from the recipient's e-mail receiving device (i.e., personal computer, fax, pager, wired or wireless telephone) indicating that the recipient wishes to view a summary list of brief headers of the stored e-mail messages, software on the server sends a shortened version of the date and time the e-mail messages were sent, including the name of the senders, the name of the recipient, and the subject headings the senders gave them. The recipient's private mail box may also contain other e-mail messages, read but not deleted, from previous sessions and, for a time, may even include messages that have been deleted but not yet purged. In continuance of the present invention, software on the server makes a decision to determine whether a selection signal has been received from the recipient's e-mail receiving device indicating that the recipient wishes to read a specific e-mail message of the stored e-mail messages. If it is determined that the selection signal has been received, software on the server makes another decision to determine whether the recipient is an opt-in customer (i.e., a recipient who has agreed with its service provider to receive e-mail messages with inserted advertisements). If it is determined that the recipient is, indeed, an opt-in customer, software on the server selects from the e-mail messages stored in the recipient's private mail box an e-mail message which is specifically related to the selection signal received from the recipient's e-mail receiving device, selects from a plurality of advertisements stored in an associate database an advertisement which corresponds to the recipients name in the selected e-mail message header and which is aligned with the personal interests of the recipient, and downloads (transfers) the selected e-mail message to the recipient's e-mail receiving device and inserts the selected advertisement into the selected e-mail message as it is downloaded to the recipient's e-mail receiving device. The selected advertisement when displayed within the selected e-mail message at the recipient's e-mail receiving device can state, for example, "This e-mail sponsored by Doubleclick.Com" or "This e-mail sponsored by MSN.COM" or "Barnes&Nobles.Com" or any other web site.

Alternatively, if it is determined that the selection signal has been received after the summary list of brief headers of the stored e-mail messages have been downloaded to the recipient's e-mail receiving device for viewing, software on the server selects from the stored e-mail messages in the recipient's private mail box an e-mail message which is specifically related to the selection signal received from the recipient's e-mail receiving device, selects from a plurality of advertising messages stored in an associate database an advertisement which corresponds to the recipient in the selected e-mail header and which is relevant to the recipient personal interests, and transfers (downloads) the selected e-mail message to the e-mail receiving device of the recipient and introduces the selected advertisement into the selected e-mail message as it is transferred to the e-mail receiving device of the recipient.

From another perspective, the present invention provides an apparatus for receiving e-mail messages over a network, which is connected at least periodically to a Wide Area Network or Internet, and storing the received e-mail messages in a recipient's private mail box associated with the apparatus. The apparatus responds to a send list signal from the recipient's e-mail receiving device by transferring (downloading) a summary list of brief headers of the e-mail messages stored in the recipient's private mail box. If it is determined that a selection signal has been received from the recipient's e-mail receiving device indicating that the recipient wishes to select a specific e-mail message to read from the stored e-mail messages, and if it is determined that the recipient is an opt-in customer who has agreed to receive e-mail messages with advertisement insertions, the apparatus responds by selecting from the stored e-mail messages in the recipient's private mail box an e-mail message which is specifically related to the selection signal received from the recipient's e-mail receiving device, selecting from a plurality of advertisements stored in an associate database an advertisement which corresponds to the recipient's name in the selected e-mail message header and which is aligned with the personal interests of the recipient, and downloading (transferring) the selected e-mail message to the recipient's e-mail receiving device and inserting the selected advertisement within the selected e-mail as it is downloaded (transferred) to the recipient's e-mail receiving device.

From yet another perspective, the apparatus alerts the recipient to the arrival of a new e-mail message by downloading to the recipient's e-mail receiving device a brief header of the newly arrived e-mail message. If a selection signal is received from the recipient's e-mail receiving device indicating that the recipient wishes to read the full text of the newly arrived e-mail message, the apparatus responds by selecting the newly arrived e-mail message from the recipient's private mail box storage queue, selecting from a plurality of advertisements stored in an associate database an advertisement which corresponds to the recipient's name in the selected e-mail message header and which is relevant to the personal interests of the recipient, and downloading the selected e-mail message to the recipient's e-mail receiving device and simultaneously inserting the selected advertisement into the e-mail message as it is downloaded to the e-mail receiving device of the recipient for reading, printing, text-to-speech and/or storing.

BRIEF DESCRIPTION OF THE DRAWINGS

A more complete understanding of the invention may be obtained from the following description and the accompanying drawings in which.

BEST MODES FOR CARRYING OUT THE INVENTION

Figure 1:
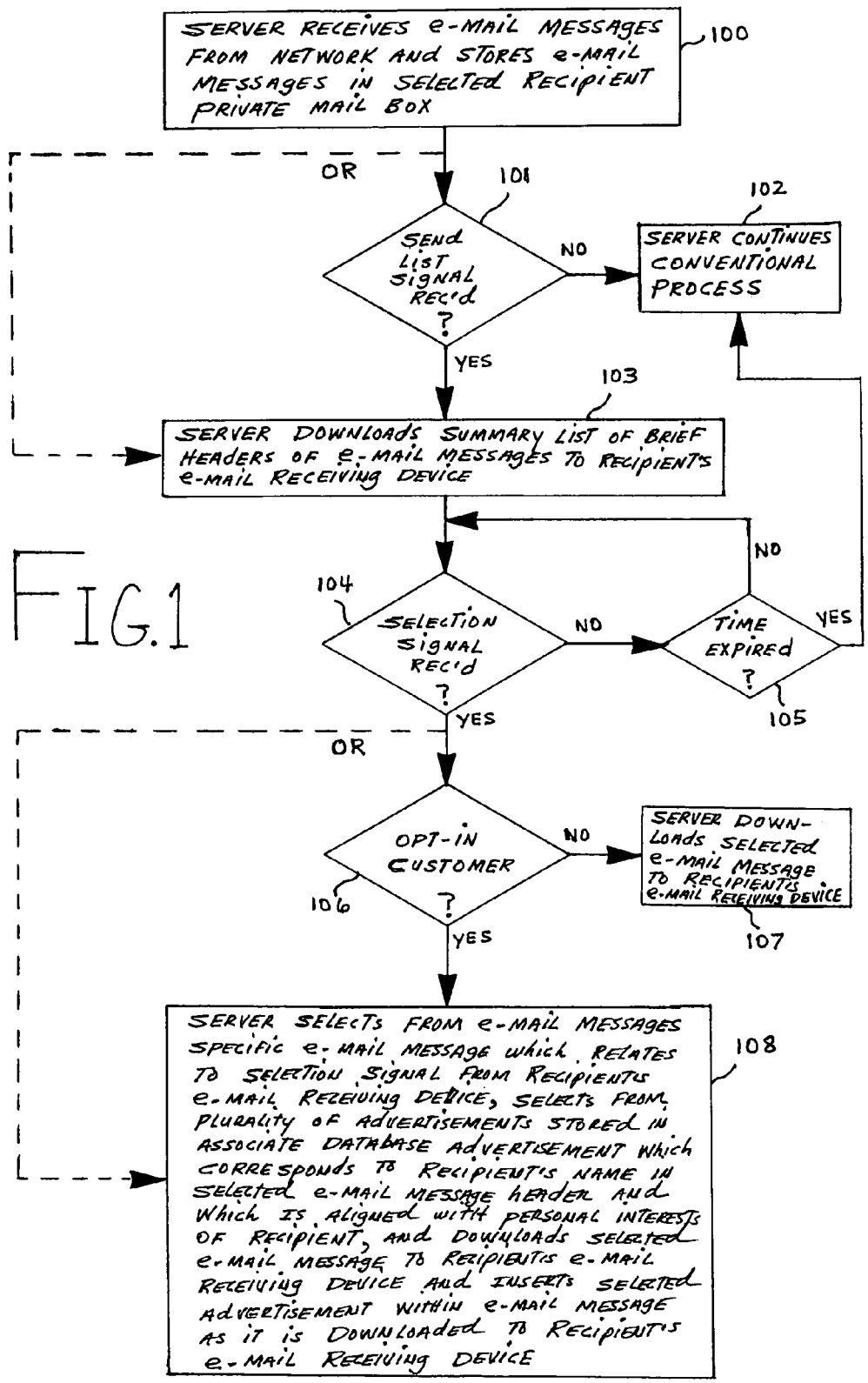
FIG. 1 shows, in flow chart form, the sequence of operations of the method of the invention.

Referring now to FIG. 1, (step 100) transmitted e-mail messages are received to a server servicing a recipient over a network, which is connected at least periodically to the Internet or Wide Area Network (not shown), and stored in the recipient's private mail box (not shown) associated with the server which can be a host-based server model, a client/server model, or a Local Area Network (LAN) model.

At step 101, software on the server determines whether a send list signal has been received from the recipient's e-mail receiving device (i.e., personal computer, fax, pager, terminal, mobile or wireless telephone) indicating that the recipient wishes to see a summary list of brief headers of the e-mail messages stored in his or her private mail box. If it is determined that a send list signal has not been received, (step 102) conventional, prior art, e-mail processing on the server continues. However, if it is determined that a send list signal has been received, (step 103) software on the server downloads (transfers) to the recipient's e-mail receiving device the summary list of brief headers of the e-mail messages stored in the recipient's private mail box for viewing, including shortened versions of the date and time the e-mail messages were sent, the name of the senders, and the subject headings the senders gave them. The recipient's private mail box storage queue contains all the new mail received but not read. It also can contain old mail, read but not deleted, from previous sessions and, for a time, may even include messages that have been deleted but not yet purged. Thus far, all of the processing of the present invention, specifically steps 100, 101, 102 and 103, have been accomplished in a conventional, prior art, manner for an e-mail system.

At step 104, software on the server makes a decision to determine whether a selection signal has been received from the recipient's e-mail receiving device indicating that the recipient wishes to select from the e-mail messages stored in his or her private mail box a specific e-mail message to read. If it is determined that a selection signal has not been received from the recipient's e-mail receiving device, (step 105) software on the server makes another decision to determine whether a predetermined time period has expired for the recipient to make a selection. If it is determined that the predetermined time period has expired, (step 102) conventional, prior art, e-mail processing on the server continues. Alternatively, if the predetermined time period has not expired, (step 104) processing is the same as previously described. If it is determined that a selection signal has, indeed, been received, (step 106) software on the server makes another decision to determine whether the recipient is an opt-in customer who has an agreement with his or her e-mail service provider to receive e-mail messages with advertisement insertions. If it is determined that the recipient is not an opt-in customer, (step 107) software on the server selects from the e-mail messages stored in the recipient's private mail box storage queue a specific e-mail message which relates to the selection signal received from the recipient's e-mail receiving device and downloads (transfers) to the recipient's e-mail receiving device the selected e-mail message for reading, printing, text-to-speech and/or storing. In the alternative, if it is determined that the recipient is an opt-in customer, (step 108) software on the server selects from the e-mail messages stored in the recipient's private mail box storage queue a specific e-mail message which relates to the selection signal received from the recipient's e-mail receiving device, selects from a plurality of advertisements stored in an associate database an advertisement which corresponds to the recipient's name in the selected e-mail message header and which is aligned with the personal interests of the recipient, and transfers (downloads) the selected e-mail message to the recipient's e-mail receiving device and introduces the selected advertisement within the e-mail message as it is transferred to the recipient's e-mail receiving device. It is to be understood that the advertisement inserted or introduced within or into the selected e-mail message can be pictorial and/or can state, for example, "This e-mail sponsored by EBay.Com" or "This e-mail sponsored by Gateway.Com" or "GTEnetworking.Com" or any other web site.

Referring now back to step 100, in the alternative, after software on the server receives a new e-mail message over the network and stores the received e-mail message in the recipient's private mail box storage queue, (steps 103, 104 and 108 or steps 103, 104, 105 and 102 or steps 103, 104, 106 and 107 or steps 103, 104, 106 and 108) processing is the same as previously described.

Figure 2:
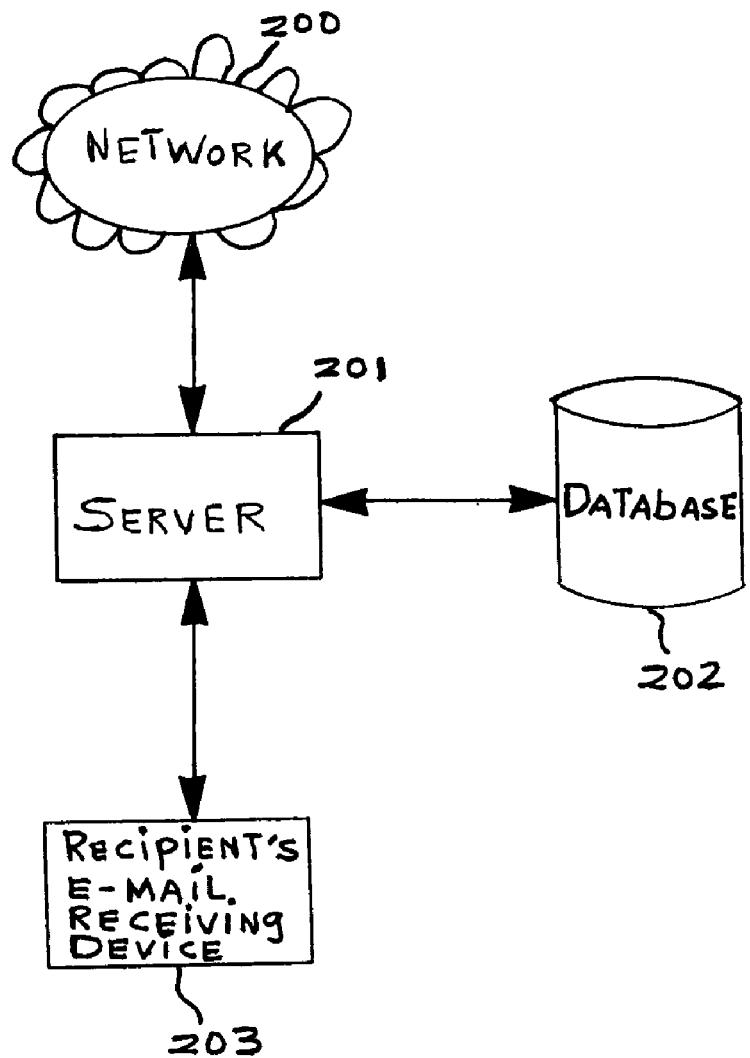
FIG. 2 shows, in block diagram form, the network 200, which is connected at least periodically to the Wide Area Network or Internet (not shown), and the database 202 connected to the server 201 which services the recipient's e-mail receiving device 203.

The general organization of an e-mail system employing the invention is illustrated in the block diagram of FIG. 2 which shows the network 200, which is connected at least periodically to the Internet or Wide Area Network (not shown), the server 201, the database 202, and the recipient's e-mail receiving device 203. By way of example, the server 201 can be of the type disclosed in U.S. Pat. No. 5,944,786 to Quinn of Aug. 31, 1999, in U.S. Pat. No. 5,905,777 to Foladare et al. of May 18, 1999, in U.S. Pat. No. 5,995,597 to Woltz et al. of Nov. 30, 1999, In U.S. Pat. No. 5,956,486 to Hickman et al. of Sep. 21, 1999, as well as in a book entitled "A Guide to the TCP/IP Protocol Suite", 1998, 2$^{nd}$ Edition, by Floyd Wilder, ISBN 0-89006-976-X, and in a book entitled "Internet E-Mail, Protocols, Standards- - -", by Lawrence Hughes, ISBN 0-89006-939-5. These citations and books are incorporated by reference herein and may be referred to for a more comprehensive understanding of the construction and operation of the e-mail system, but a brief description will be given herein to illustrate how the invention functions within an e-mail system.

The server 201 is controlled by a control program shown in FIG. 1 and other miscellaneous programs which have not been shown to simplify the drawing. The programs are composed of executable instructions which, when executed by a processor (not shown) of the server 201, carry out the functions performed by the server 201.

The server 201 (step 100 of FIG. 1) receives transmitted e-mail messages over the network 200 and stores the received e-mail messages in a recipient's private mail box (not shown) associated with the server 201, as described in the aforementioned citations and books incorporated by reference herein. The received e-mail messages show fields for the destination address, the sender's ID, the title of the e-mail messages, and the e-mail messages ID. As previously stated herein, the server 201 is controlled by the control program shown in FIG. 1. For example, in response to a send list signal from a recipient's e-mail receiving device, as shown in step 101 of FIG. 1, indicating that the recipient wishes to view a summary list of brief headers of the e-mail messages stored in the recipient's private mail box (step 103 of FIG. 1), the processor (not shown) of the server 201, under the control of the control program shown in FIG. 1, downloads (transfers) to the recipient's e-mail receiving device 203 for viewing the summary list of brief headers of the stored e-mail messages, as described in the citations and books incorporated by reference herein. In the alternative, as described in U.S. Pat. No. 5,905,777 to Foladare of May 18, 1999, (steps 100 and 103 of FIG. 1) the server 201 alerts the recipient to a newly arrived e-mail message by automatically downloading the newly arrived e-mail message to the recipient's e-mail receiving device 203.

In accordance with the present invention, (step 104 of FIG. 1) the processor (not shown) of the server 201, under the control of the control program shown in FIG. 1, determines whether a selection signal has been received from the recipient's e-mail receiving device 203 indicating that the recipient wishes to select from the e-mail messages stored in the private mail box a specific e-mail message to read. If it is determined that a selection signal has been received, (step 106 of FIG. 1) the processor (not shown) of the server 201 determines whether the recipient is an opt-in customer who is obligated to receive e-mail messages with inserted advertisements. If is determined that the recipient is, indeed, an opt-in customer, (step 108 of FIG. 1) the processor (not shown) of the server 201 selects from the e-mail messages stored in the recipient's private mail box (not shown) an e-mail message which is related to the selection signal received from the recipient's e-mail receiving device 203, selects from a plurality of advertisements (not shown) stored in an associate database 202 an advertisement which corresponds to the recipient's name in the selected e-mail message header and which is relevant to the personal interests of the recipient, and downloads the selected e-mail message to the recipient's e-mail receiving device 203 and introduces the selected advertisement into the selected e-mail message, preferably in the message header or between the message header and body (text), or after the text, as it is downloaded to the recipient's e-mail receiving device 203 for reading, printing, text-to-speech and/or storing. Again, it will be appreciated that the selected advertisement inserted or introduced within or into the selected e-mail message as it is downloaded to the recipient's e-mail receiving device 203 can be pictorial, or it can be pictorial and state, for example, "This e-mail is sponsored by CNN.COM" or "This e-mail sponsored by Wallstjournal.Com", etc.

In an alternative mode, (steps 104 and 108 of FIG. 1) the processor (not shown) of the server 201, under the control of the control program shown in FIG. 1, responds to a selection signal from the recipient's e-mail receiving device 203 by selecting from the e-mail messages stored in the recipient's private mail box storage queve a specific e-mail message which relates to the selection signal received from the recipient's e-mail receiving device 203, selecting from a plurality of advertising messages (not shown) stored in an associate database 202 an advertisement which corresponds to the recipient's name in the selected e-mail message header and which is aligned with the personal interests of the recipient, and introducing the selected advertisement into the selected e-mail message while transferring the message to the recipient's e-mail receiving device 203 for reading, printing, text-to-speech and/or storing.

It will be appreciated further that the database 202 archives a plurality of advertisements that are aligned with the personal interests of the corresponding recipients. It will be appreciated still further that the insertion of the selected advertisement into the selected e-mail message, and that the selection of the specific e-mail message to read from the plurality of stored e-mail messages, can be accomplished by any known technique and thus is not limited to any disclosure herein.

While the best mode for carrying out the invention has been disclosed, those familiar with the particular art to which this invention relates will recognize various alternative designs and embodiments for practicing the invention as defined by the following claims.

The invention claimed is:

1. A method for downloading to a recipient's electronic mail (e-mail) receiving device an e-mail message along with an advertisement, comprising the steps of:
    (a) receiving at a server servicing the recipient e-mail messages from a network which is connected at least periodically to a Wide Area Network or Internet and storing said received e-mail messages in the recipient's private mailbox;
    (b) the server, in response to receiving a send list signal from the recipient's e-mail receiving device indicating that the recipient wishes to view a summary list of brief headers of said stored e-mail messages in the recipient's private mailbox, downloading the summary list of brief headers of said stored e-mail messages to the recipient's e-mail receiving device; and
    (c) the server, in response to receiving a selection signal from the recipient's e-mail receiving device indicating that the recipient wishes to read a specific one of said e-mail messages stored in said private mailbox, selecting from said stored e-mail messages an e-mail message which relates to the selection signal received from the recipient's e-mail receiving device, selecting an advertisement from a plurality of advertisements stored in an associate database, and downloading said selected e-mail message to the recipient's e-mail receiving device and inserting said selected advertisement into said e-mail message as it is downloaded to said e-mail receiving device of the recipient.

2. The method as set forth in claim 1, further comprising the step of:
    (d) said e-mail receiving device of the recipient receiving said downloaded e-mail message with said inserted advertisement from the server and displaying said received e-mail message with said inserted advertisement at said e-mail receiving device preferably in said e-mail message header or between said e-mail header and body (text), or after said text.

3. A method for downloading an electronic mail (e-mail) message to a recipient's e-mail receiving device and inserting a promotional message into said e-mail message as it is downloaded to the recipient's e-mail receiving device, comprising the steps of:
    (a) receiving at a server servicing the recipient e-mail messages from a network and storing said received messages in the recipient's private mail box, said server automatically downloading brief headers of said received e-mail messages to the recipient's e-mail receiving device; and
    (b) said server, in response to receiving a selection signal from the recipient's e-mail receiving device indicating that the recipient wishes to read a specific one of said e-mail messages stored in the recipient's private mail box and after it has been determined that the recipient is an opt-in customer, selecting from said e-mail messages stored in the recipient's private mail box an e-mail message which relates to the selection signal received from the recipient's e-mail receiving device, selecting a promotional message from a plurality of promotional messages stored in an associate database, and downloading said selected e-mail message to the recipient's e-mail receiving device and inserting said selected promotional message into said e-mail message as it is downloaded to said e-mail receiving device of the recipient.

4. A method as set forth in claim 1, wherein the recipient's e-mail receiving device is a cellular mobile phone or other receiving and sending equipment.

5. A method as set forth in claim 1, wherein the recipient's e-mail receiving device is a computer or other receiving and sending equipment.

6. A method as set forth in claim 1, wherein the recipient's e-mail receiving device is a wired telephone.

7. A method as set forth in claim 1, wherein the recipient's e-mail receiving device is a peripheral device.

8. A method as set forth in claim 1, wherein the network is a cellular network.

9. A method as set forth in claim 1, wherein the network is a telephone network.

10. A method as set forth in claim 1, wherein the network is a cable network.

11. A method as set forth in claim 1, wherein the network is a satellite network.

12. A method as set forth in claim 1, wherein the associate database archives a plurality of advertisements (promotional messages).

13. A method as set forth in claim 1, wherein the server is a host-based server model.

14. A method as set forth in claim 1, wherein the server is a local area network server model.

15. A method as set forth in claim 1, wherein the e-mail message is a personal communication.

16. A method as set forth in claim 1, wherein the advertisement (promotional message) is a notice, such as a paid announcement which can be written or pictorial or a combination of both.

17. A method for displaying at a recipient's electronic mail (e-mail) receiving device an e-mail message with an advertisement, comprising the steps of:
    (a) receiving at a server of the recipient e-mail messages from a network which is connected at least periodically to a Wide Area Network or Internet and storing said received e-mail messages in a private mailbox of the recipient;
    (b) the server downloading a summary list of brief headers of said stored e-mail messages from the private mailbox of the recipient in response to receiving a send list signal from the recipient's e-mail receiving device indicating that the recipient wishes to view the summary list of brief headers of said stored e-mail messages;
    (c) the server selecting from the summary list of brief headers of said stored e-mail messages an e-mail message which the recipient wishes to read, selecting an advertisement from a plurality of advertisements stored in an associate database, and downloading said selected e-mail message to the recipient's e-mail receiving device and introducing said selected advertisement into said e-mail message as it is downloaded to said e-mail receiving device of the recipient in response to receiving a selection signal from the recipient's e-mail receiving device indicating that the recipient wishes to read a specific one of said stored e-mail messages and after it has been determined that the recipient is an opt-in customer; and (d) said e-mail receiving device of the recipient receiving said downloaded e-mail message with said introduced advertisement from the server and displaying said received e-mail message with said introduced advertisement at said e-mail receiving device of the recipient.

18. An enhanced electronic mail (e-mail) system, comprising:
   (a) a network which is connected at least periodically to a Wide Area Network or Internet;
   (b) a server having means for receiving from the Wide Area Network or Internet e-mail messages addressed to a selected recipient;
   (c) the server having means for storing said received e-mail messages in an addressable private mailbox having the selected recipient's name and/or e-mail address associated therewith;
   (d) the server having means for transferring a summary list of brief headers of said stored e-mail messages to the selected recipient's e-mail receiving device if a send list signal has been received from said e-mail receiving device indicating that said recipient wishes to view the summary list of brief headers of said stored e-mail messages;
   (e) the server having means for selecting a specific e-mail message from said stored e-mail messages, selecting an advertisement from a plurality of advertisements stored in an associate database, and transferring the specific e-mail message to the selected recipient's e-mail receiving device and inserting said selected advertisement into said selected e-mail message as it is transferred to said e-mail receiving device in response to receiving a selection signal from said e-mail receiving device indicating that the specific e-mail message relating to the selection signal is to be selected from said stored e-mail messages and after it has been determined that the recipient is an opt-in customer; and
   (f) said e-mail receiving device of the recipient having means for receiving said transferred e-mail message with said inserted advertisement from the server and displaying said received e-mail message and advertisement at said e-mail receiving device of the selected recipient.

19. A method for delivering to a recipient's premises equipment an electronic mail (e-mail) message and an associated advertisement, comprising the steps of:
   (a) receiving at a server servicing the recipient e-mail messages from a from a network, which is connected at least periodically to a Wide Area Network or Internet, and storing said received e-mail messages in the recipient's private mail box;
   (b) the server delivering a summary list of brief headers of said stored e-mail messages to the recipient's premises equipment; and
   (c) the server, in response to receiving a selection signal from the recipient's premises equipment indicating that the recipient wishes to read a specific one of said e-mail messages stored in the recipient's private mail box, selecting from the summary list of brief headers of said e-mail messages stored in the recipient's private mail box an e-mail message which relates to the selection signal said received from the recipient's premises equipment, selecting an advertisement from a plurality of advertisements stored in an associate database, and delivering said selected e-mail message and said selected advertisement to the recipient's premises equipment for reading, printing, text-to-speech and/or storing.

20. An enhanced electronic mail (e-mail) system, comprising:
   (a) a network which is connected at least periodically to a Wide Area Network or Internet;
   (b) a server having means for receiving e-mail messages from the network and storing said received e-mail messages in a recipient's private mail box;
   (c) the server having means for delivering a summary list of brief headers of said stored e-mail messages to the recipient's premises equipment; and
   (d) the server, in response to receiving a selection signal from the recipient's premises equipment indicating that the recipient wishes to read a specific one of said e-mail messages stored in the recipient's private mailbox, having means for selecting from the summary list of brief headers of said e-mail messages said stored in the recipient's private mail box an e-mail message which relates to the selection signal said received from the recipient's premises equipment, selecting an advertisement from a plurality of advertisements stored in an associate database, and delivering said selected e-mail message and said selected advertisement to the recipient's premises equipment for reading, printing, text-to-speech and/or storing.

21. A method for downloading to a recipient's premises equipment an electronic mail (e-mail) message and an associated advertisement, comprising the steps of:
   (a) receiving at a server servicing the recipient e-mail messages from a network, which is connected at least periodically to a Wide Area Network or Internet, and storing said received e-mail messages in the recipient's private mail box;
   (b) the server downloading a summary list of brief headers of said stored e-mail messages to the recipient's premises equipment; and
   (c) the server, in response to receiving a selection signal from the recipient's premises equipment indicating that the recipient wishes to read a specific one of said e-mail messages stored in the recipient's private mail box, and after it is determined that the recipient is an opt-in customer, selecting from the summary list of brief headers of said e-mail messages said stored in the recipient's private mail box an e-mail message which relates to the selection signal received from the recipient's premises equipment, selecting an advertisement from a plurality of advertisements stored in an associate database, and downloading said selected e-mail message and said selected advertisement to the recipient's premises equipment for reading, printing, text-to-speech and/or storing.

22. An enhanced electronic mail (e-mail) system, comprising:
   (a) a network which is connected at least periodically to a Wide Area Network or Internet;
   (b) a server having means for receiving e-mail messages from the network and storing said received e-mail messages in a recipient's private mail box;
   (c) the server having means for downloading to a summary list of brief headers of said stored e-mail messages to the recipient's premises equipment; and
   (d) the server, in response to receiving a selection signal from the recipient's premises equipment indicating that the recipient wishes to read a specific one of said e-mail messages stored in said private mailbox, and after it is determined that the recipient is an opt-in customer, having means for selecting from the summary list of brief headers of said e-mail messages said stored in the recipient's private mail box an e-mail message which relates to the selection signal said received from the recipient's premises equipment, selecting an advertisement from a plurality of advertisements stored in an associate database, and downloading said selected e-mail message and said selected advertisement to the recipient's premises equipment for reading, printing, text-to-speech and/or storing.

23. A method for inserting advertisements into subscribers' email, comprising the steps of:
    (a) receiving at a email server servicing a subscriber email messages from a network, which is connected to a Wide Area Network or Internet, and storing said received email messages in a private mail box associated with the subscriber;
    (b) the email server, in response to receiving a send list signal from the subscriber's premises equipment indicating that the subscriber wishes to view a summary list of brief headers of said stored email messages in the private mail box, transferring the summary list of brief headers of said stored email messages to the subscriber's premises equipment; and
    (c) the email server, in response to receiving a selection signal from the subscriber's premises equipment indicating that the subscriber wishes to read a specific one of said email messages stored in the private mail box, selecting from said stored email messages an email message which relates to the selection signal received from the subscriber's premises equipment, selecting from a plurality of advertisements stored in an associate database an advertisement which is relevant to the subscriber's personal interests, and inserting said selected advertisement into said selected email message.

24. An email system, comprising:
    (a) a network which is connected at least to a Wide Area Network or Internet;
    (b) an email server, which services a subscriber, having means for receiving from the network email messages addressed to the subscriber and storing said received email messages in a private mail box associated with the subscriber;
    (c) the email server, in response to receiving a send list signal from the subscriber's premises equipment indicating that the subscriber wishes to view a summary list of brief headers of said stored email messages in the private mail box, having means for delivering the summary list of brief headers of said stored email messages to the subscriber's premises equipment for viewing;
    (d) the email server, in response to receiving a selection signal from the subscriber's premises equipment indicating that the subscriber wishes to read a specific one of said email messages stored in the private mail box, having means for selecting from said stored email messages an email messages which relates to the selection signal received from the subscriber's premises equipment, selecting from a plurality of advertisements stored in an associate database an advertisement which is relevant to the subscriber's personal interests, and inserting said selected advertisement into said selected email message.

25. The system according to claim 24, wherein the email server is a web-based server model.

26. The system according to claim 24, wherein the email server has a link to said selected advertisement that it inserts into said selected email message.

27. The system according to claim 24, wherein said selected advertisement is an object, as text and/or graphics.

* * * * *